United States Patent
He et al.

(10) Patent No.: US 12,068,859 B2
(45) Date of Patent: Aug. 20, 2024

(54) HARQ CODEBOOK DETERMINATION IN WIRELESS COMMUNICATIONS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 17/593,333

(22) PCT Filed: Oct. 15, 2020

(86) PCT No.: PCT/CN2020/121298
§ 371 (c)(1),
(2) Date: Sep. 15, 2021

(87) PCT Pub. No.: WO2022/077386
PCT Pub. Date: Apr. 21, 2022

(65) Prior Publication Data
US 2022/0311549 A1 Sep. 29, 2022

(51) Int. Cl.
*H04L 1/1812* (2023.01)
*H04L 5/00* (2006.01)
*H04W 72/23* (2023.01)

(52) U.S. Cl.
CPC ............ *H04L 1/1812* (2013.01); *H04L 5/001* (2013.01); *H04W 72/23* (2023.01)

(58) Field of Classification Search
CPC ..... H04L 1/1812; H04L 5/001; H04L 1/1896; H04L 1/1614; H04L 5/0044; H04L 5/0094; H04W 72/23
See application file for complete search history.

(56) References Cited

U.S. PATENT DOCUMENTS

2019/0103943 A1 4/2019 Wang et al.
2019/0305894 A1 10/2019 Hosseini et al.
(Continued)

FOREIGN PATENT DOCUMENTS

CN 103312468 9/2013
CN 106576266 4/2017
(Continued)

OTHER PUBLICATIONS

LG Electronics, "HARQ procedure for NR-U"; 3GPP TSG RAN WG1 #99; R1-1912391; Nov. 8, 2019; 22 sheets.

Primary Examiner — Charles C Jiang
Assistant Examiner — Shawn D Miller
(74) Attorney, Agent, or Firm — Fay Kaplun & Marcin, LLP (57) ABSTRACT

A user equipment (UE) and a network agree on the use of a hybrid automatic repeat request (HARQ) codebook. The UE receives a plurality of downlink control information (DCI) transmissions during a corresponding plurality of physical downlink control channel (PDCCH) monitoring occasions from the base station, wherein each DCI transmission schedules multiple physical downlink shared channel (PDSCH) transmissions on a corresponding one of a plurality of component carriers (CCs), receives a time domain resource allocation (TDRA) table configuration from the base station, determines a maximum number of PDSCH transmissions
(Continued)

per CC based on the TDRA table configuration, groups the plurality of CCs together and determines a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions.

20 Claims, 7 Drawing Sheets

(56) References Cited

U.S. PATENT DOCUMENTS

| | | | | |
|---|---|---|---|---|
| 2021/0168812 | A1* | 6/2021 | Huang | H04B 7/0602 |
| 2022/0321275 | A1* | 10/2022 | Papasakellariou | H04L 5/0053 |
| 2023/0318761 | A1* | 10/2023 | Jang | H04W 72/1263 |
| | | | | 370/329 |

FOREIGN PATENT DOCUMENTS

| | | |
|---|---|---|
| CN | 109586877 | 4/2019 |
| CN | 109639398 | 4/2019 |
| CN | 110351016 | 10/2019 |
| CN | 111277388 | 6/2020 |

* cited by examiner

```
> j = 0 - index of occasion for candidate PDSCH reception
> Set C(K₁) to be the cardinality of set K₁.
> Set k = 0 - index of slot timing values K_{1,k}, in descending order of the slot t
  values, in set K₁ for serving cell c
> While k < C(K₁)
    - Set R to the set of rows
    - Set the C(R) to the cardinality of R
    - Set r = 0 - index of row in set R
    - While r < C(R)
        - If S ≤ (n_u - K_{1,k}) for the start slot index S for row r, R = R\r;
        - Else, r = r + 1;
        - endif.
    - End while
    - j = j + max(N_j^TB), where N_j^TB is the TB among the all rows of R
    - k = k + 1
> End while
```

HARQ CODEBOOK DETERMINATION IN WIRELESS COMMUNICATIONS

BACKGROUND

In 5G new radio (NR) wireless communications, the 5G NR network configures a physical downlink control channel (PDCCH) with downlink channel information (DCI) to schedule a physical downlink shared channel (PDSCH). A user equipment (UE) receives the PDCCH and decodes the DCI so that the UE can determine when to monitor the PDSCH. If the UE successfully decodes the PDSCH, the UE transmits an acknowledgement (ACK) to the network. If the UE does not successfully decode the PDSCH, the UE transmits a negative ACK (NACK) to the network.

SUMMARY

Some exemplary embodiments are related to a user equipment (UE) having a transceiver configured to communicate with a network and a processor communicatively coupled to the transceiver and configured to perform operations. The operations include receiving a plurality of downlink control information (DCI) transmissions during a corresponding plurality of physical downlink control channel (PDCCH) monitoring occasions from the base station, wherein each DCI transmission schedules multiple physical downlink shared channel (PDSCH) transmissions on a corresponding one of a plurality of component carriers (CCs), receiving a time domain resource allocation (TDRA) table configuration from the base station, determining a maximum number of PDSCH transmissions per CC based on the TDRA table configuration, grouping the plurality of CCs together and determining a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions.

Other exemplary embodiments are related to a processor configured to perform operations. The operations include receiving a plurality of downlink control information (DCI) transmissions during a corresponding plurality of physical downlink control channel (PDCCH) monitoring occasions from a base station, wherein each DCI transmission schedules multiple physical downlink shared channel (PDSCH) transmissions on a corresponding one of a plurality of component carriers (CCs), receiving a time domain resource allocation (TDRA) table configuration from the base station, determining a maximum number of PDSCH transmissions per CC based on the TDRA table configuration, grouping the plurality of CCs together and determining a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions.

Still further exemplary embodiments are related to a base station having a transceiver configured to communicate with a user equipment (UE) and a processor communicatively coupled to the transceiver and configured to perform operations. The operations include transmitting, to the UE, a plurality of downlink control information (DCI) transmissions during a corresponding plurality of physical downlink control channel (PDCCH) monitoring occasions from the base station, wherein each DCI transmission schedules multiple physical downlink shared channel (PDSCH) transmissions on a corresponding one of a plurality of component carriers (CCs), transmitting, to the UE, a time domain resource allocation (TDRA) table configuration, determining a maximum number of PDSCH transmissions per CC based on the TDRA table configuration, transmitting the multiple PDSCH transmissions to the UE, wherein the UE determines a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions.

DETAILED DESCRIPTION

The exemplary embodiments may be further understood with reference to the following description and the related appended drawings, wherein like elements are provided with the same reference numerals. The exemplary embodiments describe a device, system and method for a user equipment (UE) of a 5G new radio (NR) network to determine a hybrid automatic repeat request (HARQ) codebook size for multi-PDSCH scheduling.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

There is currently a need in 5G NR to address the critical power capability of reduced capability (RedCap) UEs. One function that has a significant effect on a RedCap UE's power consumption is the numerous times that it monitors the PDCCH.

According to some exemplary embodiments, a multi-PDSCH scheduling downlink control information (DCI) format may be used to increase the PDCCH monitoring periodicity, thus reducing power consumption at the UE. In addition, to avoid discrepancies between the UE and g-NodeB (gNB) regarding the payload size of a HARQ-ACK in response to the multi-PDSCH scheduling DCI, the UE is configured to determine a HARQ codebook size so that both the UE and the base station (e.g., next generation Node B (gNB)) are in agreement regarding the HARQ-ACK payload size, especially when the UE does not successfully decode a DCI of a PDCCH monitoring occasion.

Figure 1:
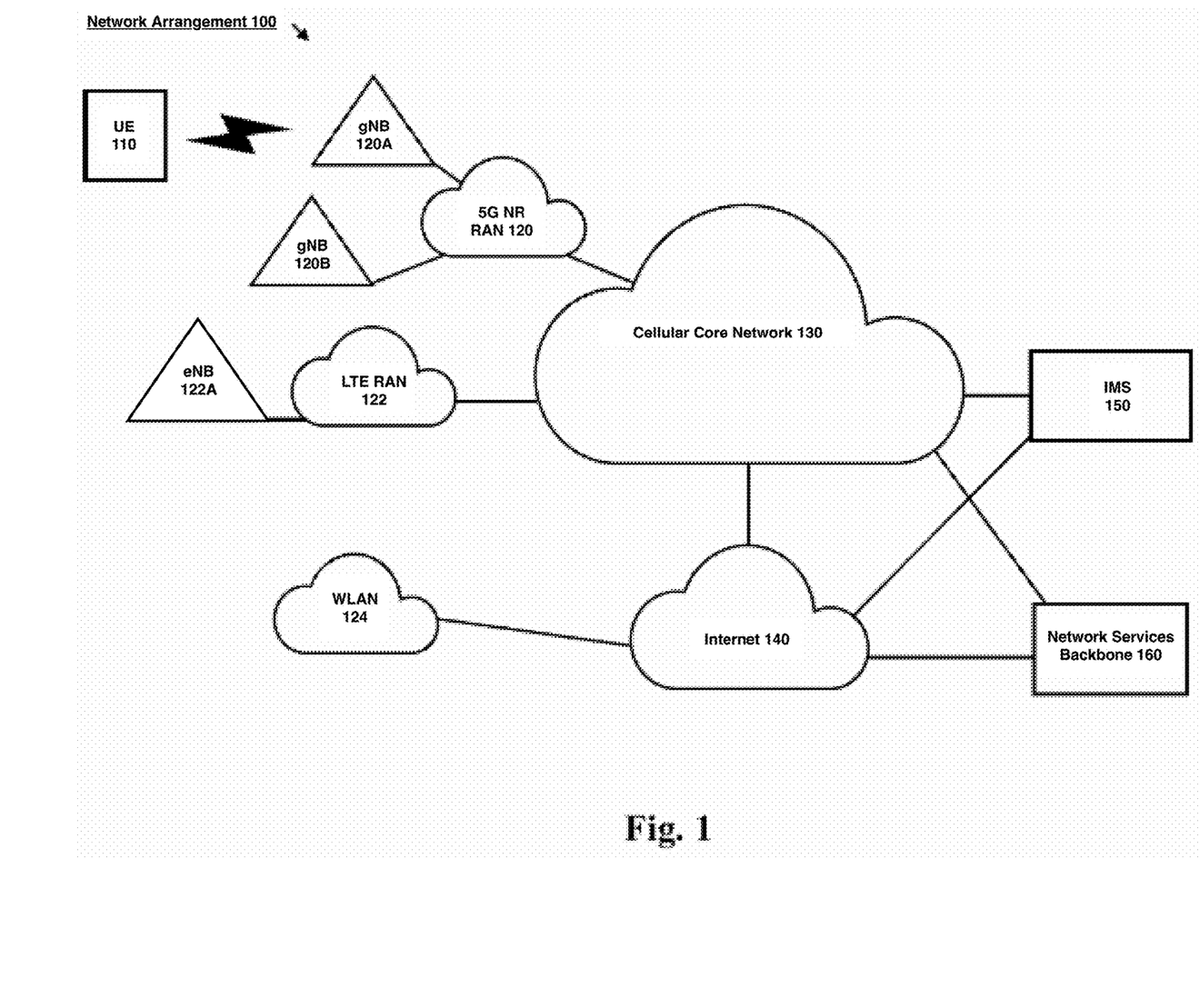
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
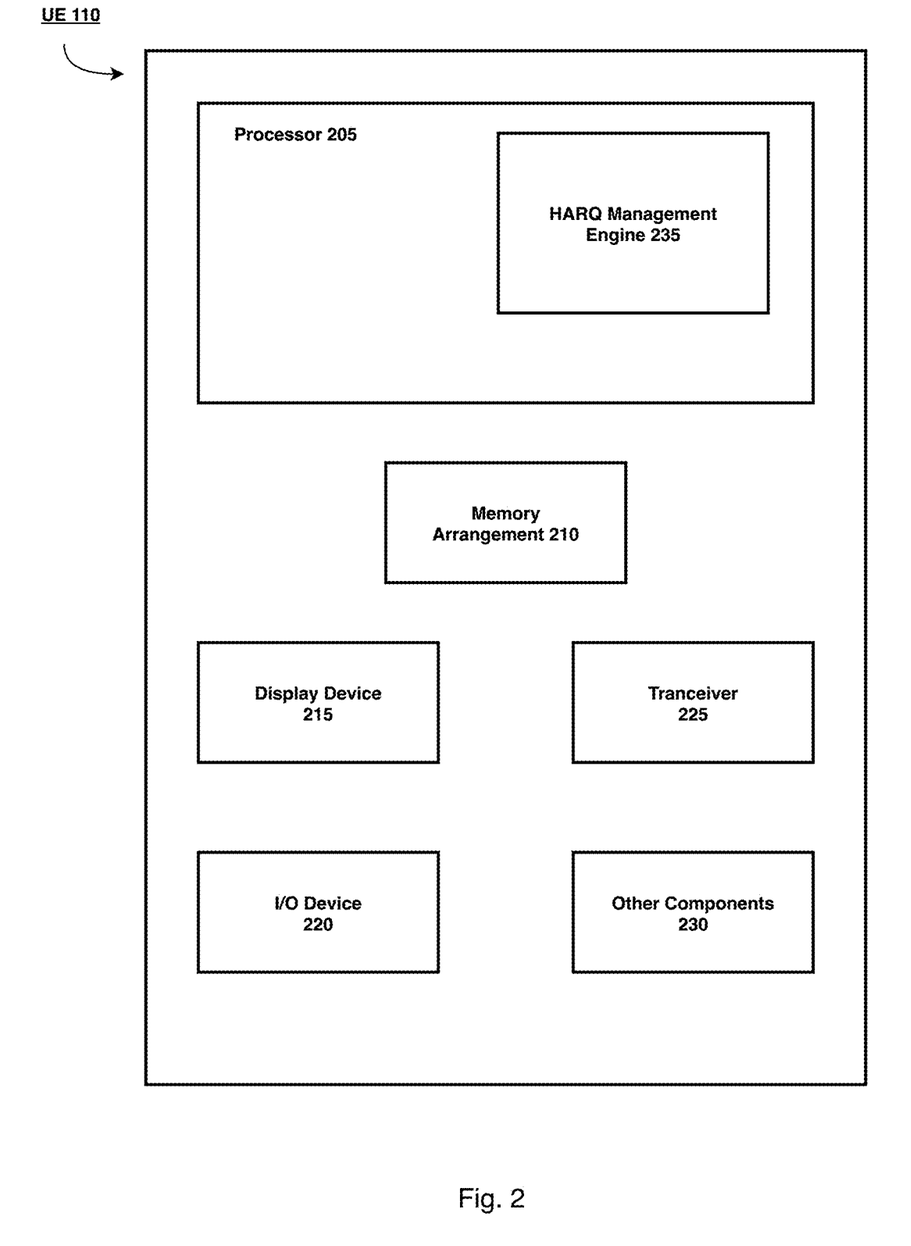
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a HARQ management engine 235. The HARQ management engine 235 may perform various operations related to determining a HARQ codebook size for multi-PDSCH scheduling scenarios. Examples of this process will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
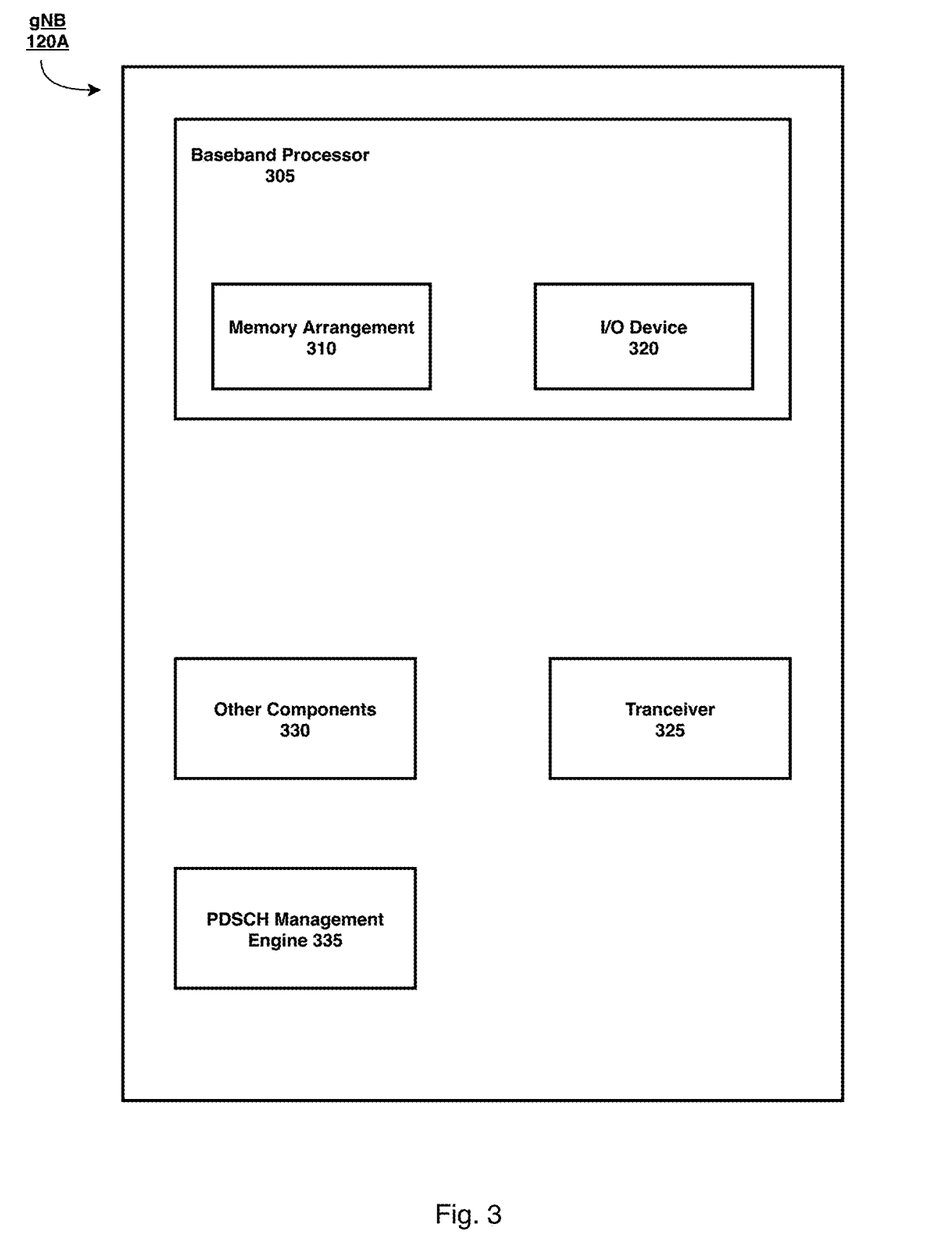
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PDSCH management engine 335 for performing operations including configuring a multi-PDSCH scheduling DCI for the UE 110. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
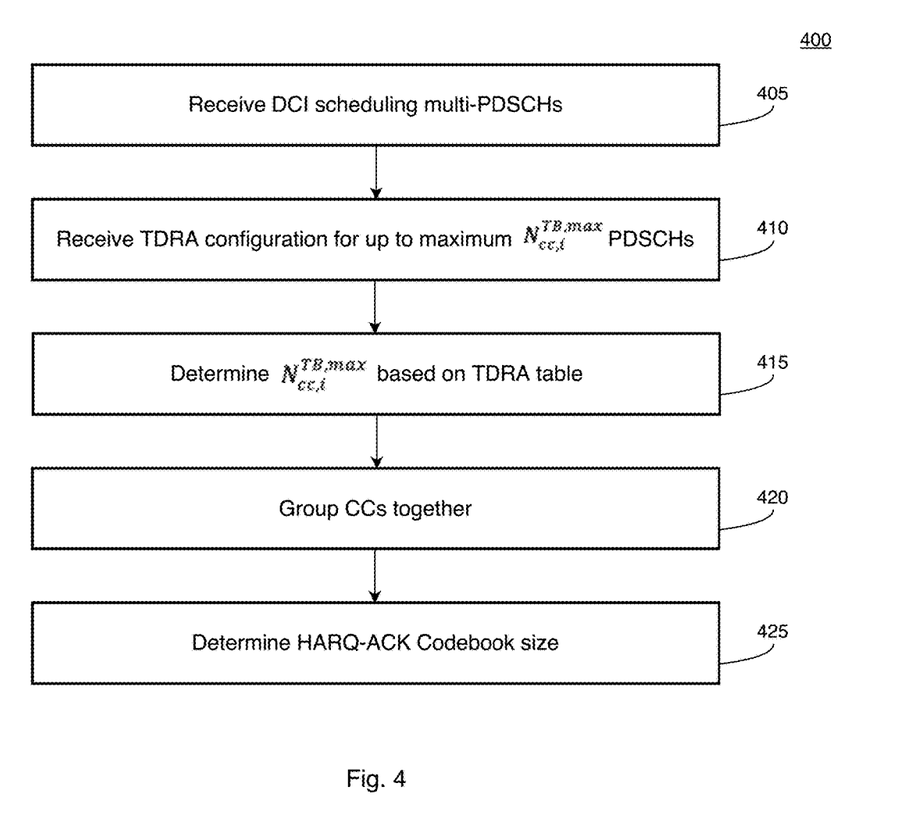
FIG. 4 shows a method of determining a hybrid automatic repeat request (HARQ) codebook size according to various exemplary embodiments.

FIG. 4 shows a method 400 of determining a HARQ codebook size according to various exemplary embodiments. At 405, the UE 110 receives a DCI during a PDCCH monitoring occasion. In some embodiments, the UE 110 receives multiple DCIs corresponding to multiple PDCCH monitoring occasions. Each DCI schedules multiple PDSCHs. At 410, the UE 110 receives a time domain resource allocation (TDRA) for up to a maximum number of PDSCHs or transport blocks (TBs) ($N_{cc,i}^{TB,max}$) on serving cell or component carrier(CC) index 'i'. In some embodiments, the TDRA is indicated in the pdsch-Conf information element (IE) of a pdsch-TimeDomainAllocationList configuration. At 415, the UE 110 determines the value of $N_{cc,i}^{TB,max}$ based on the TDRA table configured by RRC signal for the UE's serving cell or CC index 'i'. In some embodiments, different CCs may be configured with different TDRA tables by the RRC signaling. The time domain resource allocation for a given PDSCH reception on a CC is indicated by the received DCI based on the RRC_configured TDRA.

Figure 5:
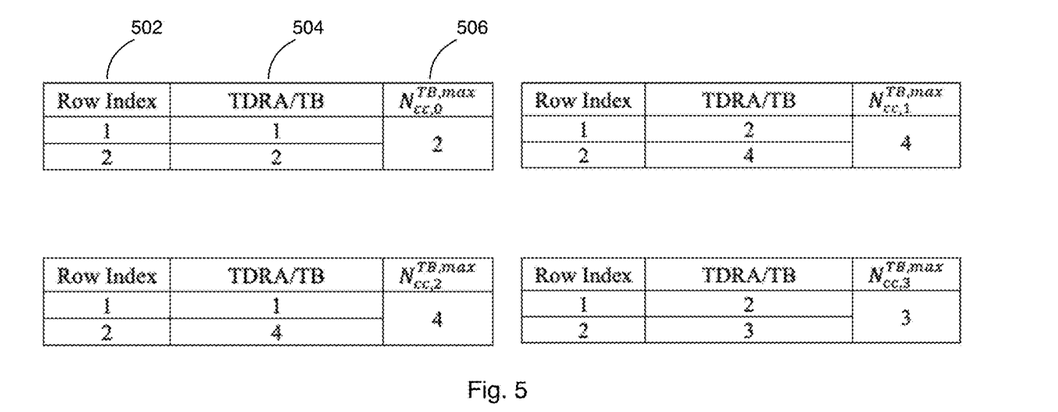
FIG. 5 shows exemplary tables of time domain resource allocation (TDRA) tables according to various exemplary embodiments.

FIG. 5 shows examples of TDRA tables for four different serving cells or CCs i.e. CC0, CC1, CC2, CC3. In some embodiments, the number of actually scheduled transport blocks (TBs) 504 by a single DCI is signaled by the selected row index 502 of the TDRA table configured by RRC for the corresponding CC. In some embodiments, a different row index 502 may be selected on a per PDCCH occasion basis and then signaled by the DCI. Based on each TDRA table, the maximum number of TBs for each TDRA table of each serving cell/CC is determined as the $N_{cc,i}^{TB,max}$ 506.

In some embodiments, the gNB 120A may alternatively configure the UE 110 with one or more groups of serving cells via a radio resource control (RRC) configuration. In some embodiments, each group is configured a maximum number of $N_{group,j}^{TB,max}$ PDSCHs for a single DCI. In some embodiments, the UE 110 alternatively determines $N_{group,j}^{TB,max}$ based on the maximum number of TDRAs/TBs (e.g., 504) associated with a single TDRA row (e.g., 502) for multi-PDSCH scheduling.

Returning to FIG. 4, at 420, for a HARQ-ACK bit determination, the UE 110 may group together different CCs that have the same $N_{cc,i}^{TB,max}$ value. In such a scenario, the maximum number of PDSCHs in a given CC group ($N_{group,k}^{TB,max}$) is equal to $N_{cc,i}^{TB,max}$. In some embodiments, CC grouping may alternatively be configured by RRC signaling from the gNB 120A. In such a scenario, the maximum number of PDSCHs in a given CC group ($N_{group,k}^{TB,max}$) is equal to the maximum number of PDSCHs ($N_{cc,i}^{TB,max}$) in any of the CCs of the group.

In some embodiments, the DCI received during the PDCCH monitoring occasion includes two downlink assignment indicators (DAIs) specific to each CC group: a counter DAI (C-DAI) and a total DAI (T-DAI). The C-DAI indicates the cumulative number of PDCCH monitoring occasions in a CC group up to the current CC and current PDSCH monitoring occasion. The C-DAI is first counted by ascending CC index number and, subsequently, by ascending monitoring occasion index number. The T-DAI indicates the total number of PDCCH monitoring occasions in a CC group. In some embodiments, the T-DAI may be updated from one PDCCH monitoring occasion to the next. For example, although the DCI of one PDSCH monitoring occasion may indicate that the T-DAI is 3, the T-DAI may be updated in a later PDCCH monitoring occasion to reflect a different number (e.g., 4), which includes all PDCCH scheduling across CCs up to the current slot where the T_DAI is transmitted.

At 425, the UE 110 determines the HARQ codebook size. In some embodiments, for each multi-PDSCH scheduling DCI received, the UE 110 designates $N_{group,k}^{TB,max}$ information bits for the HARQ-ACK response. The UE 110 then generates an ACK or NACK based on the result of decoding each scheduled PDSCH. If $N_{group,k}^{TB,max}$ is greater than the number of actually scheduled PDSCHs, then the UE 110 generates NACKs for the difference to ensure that the codebook size for each multi-PDSCH transmission is constant. For example, if a DCI schedules 2 PDSCHs and $N_{group,k}^{TB,max}=4$, then the UE 110 will generate 4 information bits for the HARQ-ACK response for this multi-PDSCH scheduling occasion. The first 2 bits are ACK/NACK depending on the result of decoding each of the 2 scheduled PDSCHs. The second 2 bits are NACKs because $N_{group,k}^{TB,max}$ is greater than the 2 scheduled PDSCHs. If, for example, the UE 110 successfully decodes both PDSCHs, then the resulting HARQ-ACK response would be ACK, ACK, NACK, NACK.

Figure 6:
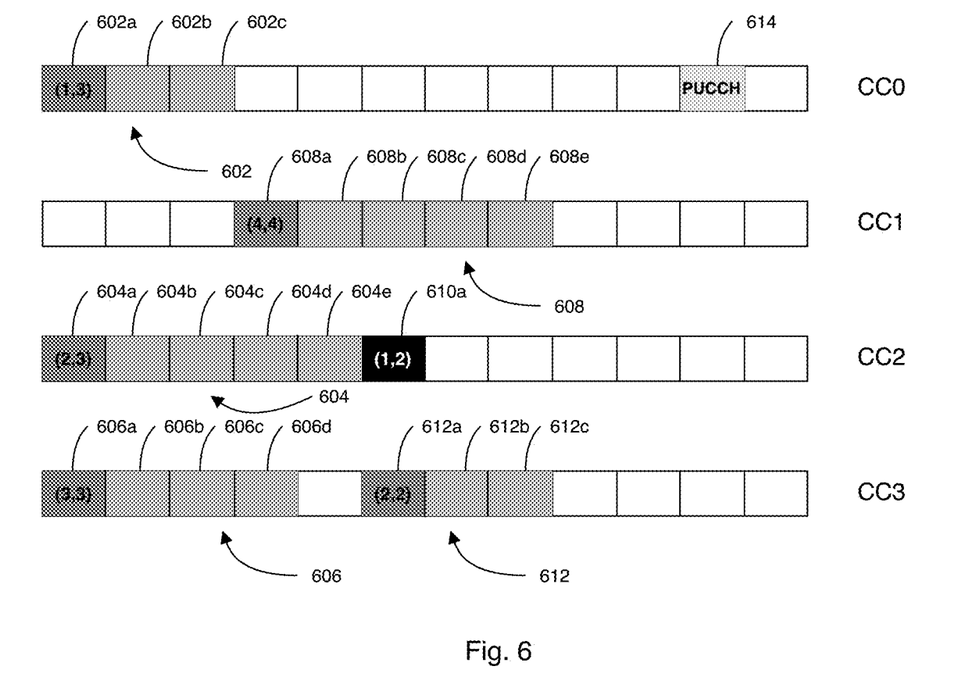
FIG. 6 shows a diagram illustrating an exemplary multi-PDSCH reception scenario according to various exemplary embodiments.

FIG. 6 shows a diagram illustrating an exemplary multi-PDSCH reception scenario according to various exemplary embodiments. FIG. 6 assumes four CCs and that the TDRA tables of FIG. 5 apply to these four CCs. Since the largest $N_{cc,i}^{TB,max}$ of these tables is 4, then $N_{group,k}^{TB,max}=4$. As such, for each successfully received DCI, the UE 110 will generate 4 HARQ-ACK bits. As illustrated in FIG. 6, the UE 110 successfully receives/decodes the multi-PDSCH scheduling DCIs of PDCCH monitoring occasions 602a, 604a, 606a, 608a, and 612a. As explained above, since $N_{group,k}^{TB,max}=4$, then the UE will generate 4 HARQ-ACK bits regardless of how many PDSCHs are actually scheduled to ensure that there is no mismatch between the UE 110 and the gNB 120A regarding the number of HARQ-ACK bits in case of a missed DCI detection at the UE side. The difference between $N_{group,k}^{TB,max}$ and the actually scheduled PDSCHs will result in a NACK for each extra HARQ-ACK bit. As such, the UE 110 will generate ACK, ACK, NACK, NACK for the PDSCHs 602b and 602c, ACK, ACK, ACK, ACK for the PDSCHs 604b-604e, ACK, ACK, ACK, NACK for the PDSCHs 606b-606d, ACK, ACK, ACK, ACK for the PDSCHs 608b-608e, and ACK, ACK, NACK, NACK for the PDSCHs 612b and 612c.

Although the UE 110 successfully processes the multi-PDSCH transmissions 602, 604, 606, 608, and 612, the UE 110 does not successfully receive/process/detect the PDCCH 610a. Because each PDCCH monitoring occasion includes the C-DAI and T-DAI, the UE 110 understands that it did not receive a DCI. For example, as illustrated in FIG. 6, the C-DAI and T-DAI of PDCCH monitoring occasions 602a-606a are (1,3), (2,3), and (3,3), respectively. As such, when the UE 110 receives the DCI at PDCCH monitoring occasion 602a, the UE 110 knows that this is the first of a total of three monitoring occasions. Similarly, the second PDCCH monitoring occasion 604a is the second of a total of three monitoring occasions. The T-DAI of PDCCH monitoring occasion 608a was updated to 4. As such, the C-DAI and T-DAI of PDCCH monitoring occasion 608a is (4,4). As noted above, the C-DAI is counted by CC index first (C0-C3) and then by PSCCH monitoring occasion. In other words, referring to FIG. 6, the C-DAI is counted from top to bottom first (by CC index) and then from left to right (by PDCCH monitoring occasion).

When the UE 110 receives the DCI of PDCCH monitoring occasion 612a, the UE 110 similarly knows that this PDCCH monitoring occasion is the second of a total of two monitoring occasions. Since the UE 110 has not received the DCI of a PDCCH monitoring occasion having a C-DAI and T-DAI of (1,2) (the first of the total of two indicated in PDCCH monitoring occasion 612a), the UE 110 knows that it missed a DCI.

The HARQ-ACK codebook size may be determined based on the T-DAI of the last detected PDCCH monitoring occasion and $N_{group,k}^{TB,max}$; specifically, the product of these two parameters. In the scenario depicted in FIG. 6, the last T-DAI of the last detected PDCCH monitoring occasion 612a is 2. However, because the UE 110 previously detected a T-DAI value of 4 in CC1, the UE 110 determines that it has missed a DCI and that the T-DAI used to determine the HARQ-ACK codebook size is actually 6 (4+2). As noted earlier $N_{group,k}^{TB,max}=4$. Therefore, the codebook size is 24 bits. As a result of this process, both the UE 110 and the gNB 120A agree on a 24-bit HARQ-ACK codebook size. The gNB 120A configures 6 PDCCH monitoring occasions. Knowing that $N_{group,k}^{TB,max}$ is 4, the gNB 120A will expect a 24-bit HARQ-ACK payload. Although the UE 110 missed a DCI of one of the PDCCH monitoring occasions, the C-DAI and T-DAI apprise the UE 110 of this failure and the UE 110 is still able to determine the correct 24-bit HARQ-ACK payload size.

Also shown in FIG. 6 is the PUCCH transmission 614. In the example shown in FIG. 6, it is assumed that the UE 110 is configured with a set of K1 values for HARQ-ACK feedback where K1 can be 2, 3, 4, 6, 7, 8. The K1 value indicates how many TBs from the last TB of the multi-PDSCH transmission the PUCCH 614 is sent (e.g., for multi-PDSCH transmission 602, K1=8).

Figure 7A:
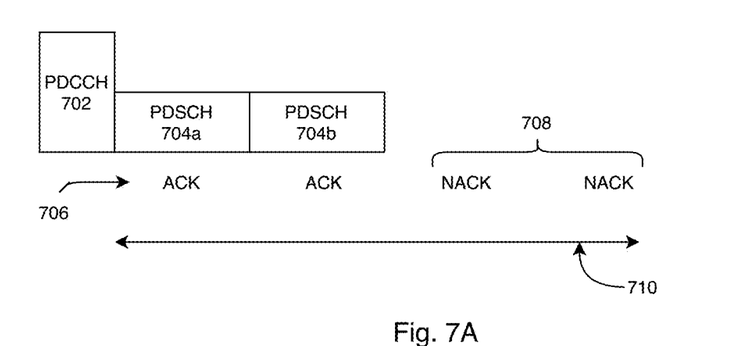
FIGS. 7A-7C show diagrams illustrating exemplary HARQ-ACK compression schemes according to various exemplary embodiments.
Figure 7B:
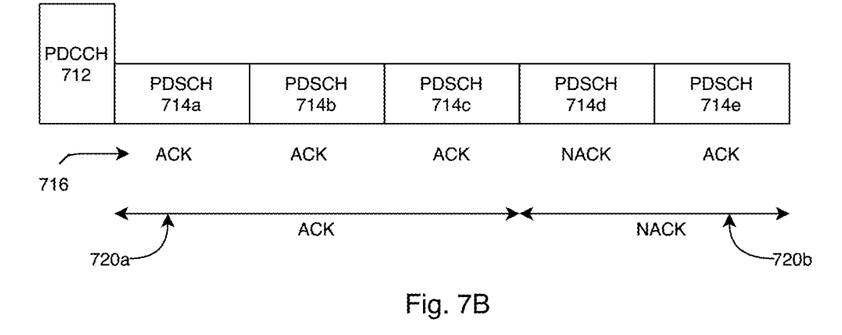
Figure 7C:
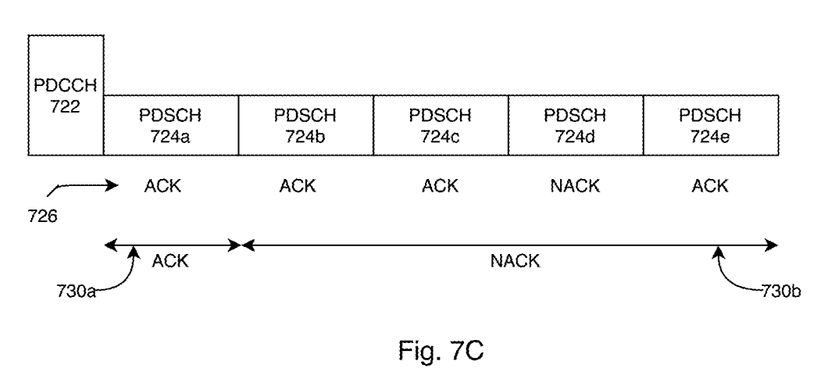

In some embodiments, in addition to the CC grouping of 420, the UE 110 may perform a HARQ-ACK compression. FIGS. 7A-7C show diagrams illustrating exemplary HARQ-ACK compression schemes according to various exemplary embodiments. In some embodiments, the UE 110 may utilize a compression window having a size W, where $W=N_{group,k}^{TB,max} * \alpha_{group,k}$ and $\alpha_{group,k}$ is a compression factor of (¼, ½, 1). A compression factor of $\alpha_{group,k}=1$ means there is no compression. In some embodiments, the value of $\alpha_{group,k}$ may be configured via RRC signaling by the gNB 120A on a per UE basis. In the following description, $M_{cc,m}^{TB}$ will denote the number of TBs/PDSCHs that are scheduled by the gNB 120A at PDCCH monitoring occasion 'm.'

If $M_{cc,m}^{TB}$ is less than or equal to W, then the HARQ-ACK bit sequence generated by the UE 110 will include $M_{cc,m}^{TB}$ HARQ-ACK bits based on the decoding results of the PDSCHs plus $(W-M_{cc,m}^{TB})$ bits, each of which have a NACK value. For example, as shown in FIG. 7A, a PDCCH monitoring occasion 702 with two scheduled PDSCHs 704a and 704b ($M_{cc,m}^{TB}=2$) is scheduled for the UE 110. Assuming the window 710 has a size of W=4, the HARQ-ACK bit sequence 706 includes ACK, ACK (assuming successful decoding of both PDSCHs 704a, 704b) and a padding 708 of two NACKs ($W-M_{cc,m}^{TB}$).

If, however, $M_{cc,m}^{TB}$ is greater than W, then the UE 110 may divide the $M_{cc,m}^{TB}$ into a first sub-window having a size of $S=(M_{cc,m}^{TB}/W)$ bits and a second sub-window having bits corresponding to the remaining $(M_{cc,m}^{TB}-S)$ scheduled PDSCHs. For example, as shown in FIG. 7B, a PDCCH monitoring occasion 712 with 5 scheduled PDSCHs 714a-714e ($M_{cc,m}^{TB}=5$) is scheduled for the UE 110. Assuming the window has a size of W=2, the sub-window size S would be (5/2=3) (rounded up to the nearest whole number). As a result, a first sub-window 720a includes 3 bits, which correspond to scheduled PDSCHs 714a-714c, and a second sub-window 720b includes 2 bits corresponding to the remaining scheduled PDSCHs 714d and 714e. FIG. 7B assumes that PDSCH 714d was not properly decoded. As a result, the HARQ-ACK bit sequence 716 is ACK, ACK, ACK, NACK, ACK. The compression scheme in this example yields an ACK for the first sub-window 720a and a NACK for the second sub-window 720b (due to the presence of a NACK in sub-window 720b). As a result, the gNB 120a would retransmit both PDSCHs 714d and 714e that are associated with the second sub-window 720b.

In some embodiments, the UE 110 may alternatively group j PDSCHs together in a first sub-group, where j is less than W, and the remaining (W−j) PDSCHs together in a second sub-group. The motivation behind this grouping is that there is a tight correlation of the decoding of the PDSCHs in the time domain due to the channel correlation property in time. For example, as shown in FIG. 7C, a PDCCH monitoring occasion 722 with 5 scheduled PDSCHs 724a-724e ($M_{cc,m}^{TB}$=5) is scheduled for the UE 110. Assuming the window has a size of W=2, a first sub-window 730a includes 1 bit corresponding to scheduled PDSCH 724a and the second sub-window 730b includes 4 bits corresponding to scheduled PDSCHs 724b-724e. FIG. 7C also assumes that PDSCH 724d was not properly decoded. As a result, the HARQ-ACK bit sequence 726 is ACK, ACK, ACK, NACK, ACK. The compression scheme in this example yields an ACK for the first sub-window 730a and a NACK for the second sub-window 730b (due to the presence of a NACK in sub-window 730b). As a result, the gNB 120a would retransmit PDSCHs 714b, 714c, 714d, and 714e that are associated with the second sub-window 730b.

In some embodiments, a HARQ-ACK Codebook may indicate the number of continuous PDSCH receptions scheduled by a single multi-PDSCH DCI Format and successfully decoded at the UE side. One example of 2-bit HARQ-ACK code states is provided in the table below. This codebook advantageously indicates to the gNB 120A how many PDSCHs, beginning with the first scheduled PDSCH with DAI=1, have been successfully decoded by the UE and, therefore, how many failed PDSCHs should be retransmitted.

| HARQ-ACK states (PDSCH decoding results) HARQ_ACK(1), HARQ_ACK(2), . . . , HARQ_ACK($N_{group,k}^{TB,max}$) | Mapped HARQ-ACK states |
|---|---|
| DTX, any, . . . | DRX |
| ACK, NACK/DTX, any, . . . (1 ACK) | State_1 |
| ACK, ACK, NACK/DTX, any, . . . (2 Consecutive ACKs) | State_2 |
| ACK, ACK, ACK, NACK/DTX, any, . . . (3 Consecutive ACKs) | State_3 |
| . . . | |
| ACK, ACK, ACK, ACK, . . . ACK (N Consecutive ACKs) | State_N |

Figure 8:
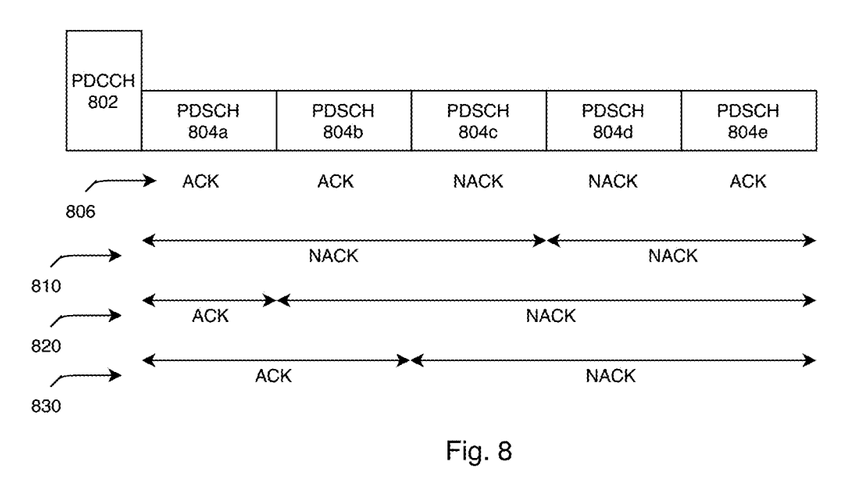
FIG. 8 shows a diagram illustrating exemplary HARQ-ACK compression schemes according to various exemplary embodiments.

FIG. 8 shows a diagram illustrating exemplary HARQ-ACK compression schemes according to various exemplary embodiments. As shown in FIG. 8, a PDCCH monitoring occasion 802 with 5 scheduled PDSCHs 804a 804e ($M_{cc,m}^{TB}$=5) is scheduled for the UE 110. Assuming the window has a size of W=2, the sub-window size S would be (5/2=3) (rounded up to the nearest whole number). FIG. 8 assumes that PDSCHs 804c and 804d were not properly decoded. As a result, the HARQ-ACK bit sequence 806 is ACK, ACK, NACK, NACK, ACK. Compressed HARQ-ACK bit sequence 810 is based on the compression scheme described above with respect to FIG. 7B. As a result of compression scheme 810, the gNB 120a would retransmit all five PDSCHs 804a-804e. Compressed HARQ-ACK bit sequence 820 is based on the compression scheme described above with respect to FIG. 7C. As a result of compression scheme 820, the gNB 120a would retransmit the last four PDSCHs 804b-804e.

Based on the table above, the UE 110 uses a compression scheme 830 to group the first two PDSCHs in a first sub-window having 2 bits, which correspond to the 2 consecutive ACKS for PDSCHs 804a and 804b, and the last three PDSCHs in a second sub-window having 3 bits, which correspond to the remaining scheduled PDSCHs 804c-804e. The compression scheme 830 yields an ACK for the first sub-window and a NACK for the second sub-window (due to the presence of two NACKs in the second sub-window). As a result of compression scheme 830, the gNB 120a would retransmit PDSCHs 804c-804e. It should be noted that although one scheme may seem to yield better results than another scheme, the results discussed above are based primarily on the assumed values of the variables explained above ($N_{group,k}^{TB,max}$, $\alpha_{group,k}$, W, S, etc.) and that the results are, therefore, dictated by the value of these variable.

Figure 9A:
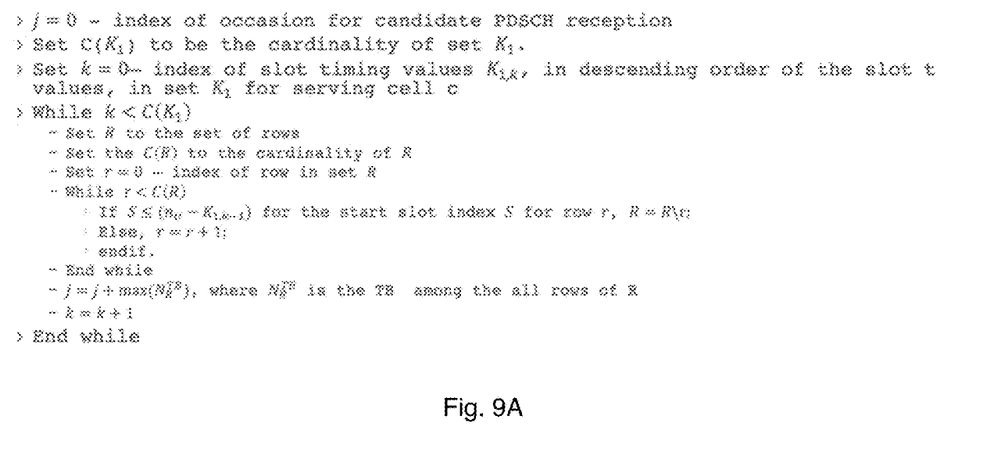
FIG. 9A shows pseudocode illustrating a Type I HARQ codebook determination process according to various exemplary embodiments.
Figure 9B:
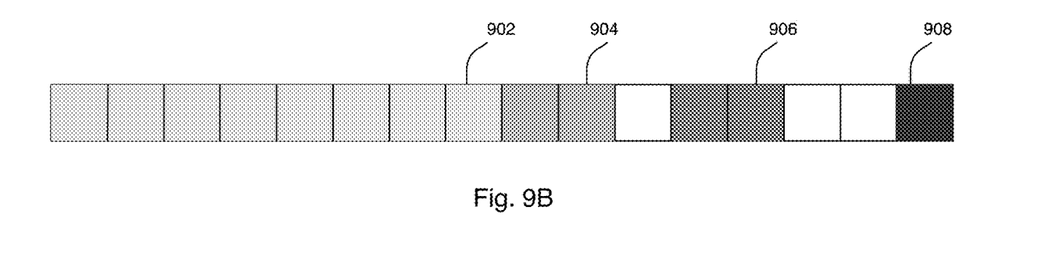
FIG. 9B shows a diagram illustrating a Type I HARQ codebook determination process according to various exemplary embodiments.

FIG. 9A shows pseudocode illustrating a Type I HARQ codebook determination process according to various exemplary embodiments. FIG. 9B shows a diagram illustrating a Type I HARQ codebook determination process according to various exemplary embodiments. In some embodiments, the UE 110 is configured with a plurality of K1 values. The UE then uses the configured K1 values and the pseudocode shown in FIG. 9A to determine the PDCCH monitoring occasions and the maximum scheduled TBs corresponding to different multi-PDSCH transmissions. For example, as illustrated in FIG. 9B, the UE 110 may be configured with K1 values of (8, 6, 5, 3, 2) corresponding to PUCCH transmission 908. Based on these K1 values, the UE determines a first multi-PDSCH transmission 902 corresponding to K1=8, a second multi-PDSCH transmission 904 corresponding to K1=6, and a third multi-PDSCH transmission 906 corresponding to K1=3. FIG. 9B assumes that there are no valid TDRAs for K1=5 and K1=2. The Type I HARQ codebook excludes overlapping between the scheduled multi-PDSCHs. As shown in FIG. 9B, only the 2 TBs after the end of the first multi-PDSCH transmission 902 are shown. Similarly, only the 2 TBs after the K1=5 is shown. As a result, the resulting HARQ-ACK payload size (codebook size) is 12 bits (8 from the first multi-PDSCH transmission 902, 2 from the second multi-PDSCH transmission 904, and 2 from the third multi-PDSCH transmission 906).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a transceiver configured to communicate with a base station; and
a processor communicatively coupled to the transceiver and configured to perform operations comprising:
receiving a plurality of downlink control information (DCI) transmissions during a corresponding plurality of physical downlink control channel (PDCCH) monitoring occasions from the base station, wherein each DCI transmission schedules multiple physical downlink shared channel (PDSCH) transmissions on a corresponding one of a plurality of component carriers (CCs);
receiving a time domain resource allocation (TDRA) table configuration from the base station;
determining a maximum number of PDSCH transmissions per CC based on the TDRA table configuration;
grouping the plurality of CCs together, wherein CCs having the same maximum number of PDSCH transmissions per CC are grouped together, and wherein a maximum number of PDSCH transmissions per group is equivalent to the maximum number of PDSCH transmissions per CC;
determining a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions; and
generating a plurality of HARQ bits for each of the multiple PDSCH transmissions, wherein the plurality of HARQ bits is equal to the maximum number of PDSCH transmissions per group.

2. The UE of claim 1, wherein DCI transmission comprises:
a counter downlink assignment indicator (C-DAI) indicating a cumulative number of PDCCH monitoring occasions in a CC group up to a current C-DAI; and
a total DAI (T-DAI) indicating a total number of PDCCH monitoring occasions in a CC group.

3. The UE of claim 1, wherein the plurality of HARQ bits includes a decoding acknowledgement for each of the multiple PDSCH transmissions and one or more NACK bits corresponding to the difference between the plurality of multi-PDSCH transmission and the maximum number of PDSCH transmissions per group.

4. The UE of claim 3, wherein the HARQ-ACK codebook size is the product of a total DAI (T-DAI) indicating a total number of PDCCH monitoring occasions in a CC group of a last PDCCH monitoring occasion and the maximum number of PDSCH transmissions per group.

5. The UE of claim 1, wherein the operations further comprise:
performing a HARQ compression on the plurality of HARQ bits based on a HARQ compression scheme.

6. The UE of claim 5, wherein the HARQ compression scheme includes applying a compression factor to the maximum number of PDSCH transmissions per group to determine a bundling window size.

7. The UE of claim 6, wherein if the bundling window is greater than or equal to a number of PDSCH transmissions scheduled by the DCI transmission, the plurality of HARQ bits include a decoding acknowledgement for each of the multiple PDSCH transmissions and one or more NACK bits corresponding to the difference between the number of multiple PDSCH transmissions and the bundling window size.

8. The UE of claim 6, wherein if the bundling window is less than a number of PDSCH transmissions scheduled by the DCI transmission, the operations further comprise:
determining a HARQ bit for each of the multiple PDSCH transmissions to obtain multiple HARQ bits, wherein the HARQ bit is based on a result of decoding a corresponding one of the multiple PDSCH transmissions;
determining a first sub-window corresponding to a first subset of the multiple HARQ bits and a second sub-window corresponding to a second subset of the multiple HARQ bits.

9. A processor configured to perform operations comprising:
receiving a plurality of downlink control information (DCI) transmissions during a corresponding plurality of physical downlink control channel (PDCCH) monitoring occasions from a base station, wherein each DCI transmission schedules multiple physical downlink shared channel (PDSCH) transmissions on a corresponding one of a plurality of component carriers (CCs);
receiving a time domain resource allocation (TDRA) table configuration from the base station;
determining a maximum number of PDSCH transmissions per CC based on the TDRA table configuration;
grouping the plurality of CCs together, wherein CCs having the same maximum number of PDSCH transmissions per CC are grouped together, and wherein a maximum number of PDSCH transmissions per group is equivalent to the maximum number of PDSCH transmissions per CC;
determining a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions; and
generating a plurality of HARQ bits for each of the multiple PDSCH transmissions, wherein the plurality of HARQ bits is equal to the maximum number of PDSCH transmissions per group.

10. The processor of claim 9, wherein DCI transmission comprises:
a counter downlink assignment indicator (C-DAI) indicating a cumulative number of PDCCH monitoring occasions in a CC group up to a current C-DAI; and
a total DAI (T-DAI) indicating a total number of PDCCH monitoring occasions in a CC group.

11. The processor of claim 9, wherein the plurality of HARQ bits includes a decoding acknowledgement for each of the multiple PDSCH transmissions and one or more NACK bits corresponding to the difference between the plurality of multi-PDSCH transmission and the maximum number of PDSCH transmissions per group.

12. The processor of claim 9, wherein the operations further comprise:
performing a HARQ compression on the plurality of HARQ bits based on a HARQ compression scheme.

13. The processor of claim 12, wherein the HARQ compression scheme includes applying a compression factor to the maximum number of PDSCH transmissions per group to determine a bundling window size.

14. The processor of claim 13, wherein if the bundling window is greater than or equal to a number of PDSCH transmissions scheduled by the DCI transmission, the plurality of HARQ bits include a decoding acknowledgement for each of the multiple PDSCH transmissions and one or more NACK bits corresponding to the difference between the number of multiple PDSCH transmissions and the bundling window size.

15. The processor of claim 13, wherein if the bundling window is less than a number of PDSCH transmissions scheduled by the DCI transmission, the operations further comprise:
  determining a HARQ bit for each of the multiple PDSCH transmissions to obtain multiple HARQ bits, wherein the HARQ bit is based on a result of decoding a corresponding one of the multiple PDSCH transmissions;
  determining a first sub-window corresponding to a first subset of the multiple HARQ bits and a second sub-window corresponding to a second subset of the multiple HARQ bits.

16. The processor of claim 11, wherein the HARQ-ACK codebook size is the product of a total DAI (T-DAI) indicating a total number of PDCCH monitoring occasions in a CC group of a last PDCCH monitoring occasion and the maximum number of PDSCH transmissions per group.

17. A method, comprising:
  receiving a plurality of downlink control information (DCI) transmissions during a corresponding plurality of physical downlink control channel (PDCCH) monitoring occasions from the base station, wherein each DCI transmission schedules multiple physical downlink shared channel (PDSCH) transmissions on a corresponding one of a plurality of component carriers (CCs);
  receiving a time domain resource allocation (TDRA) table configuration from the base station;
  determining a maximum number of PDSCH transmissions per CC based on the TDRA table configuration;
  grouping the plurality of CCs together, wherein CCs having the same maximum number of PDSCH transmissions per CC are grouped together, and wherein a maximum number of PDSCH transmissions per group is equivalent to the maximum number of PDSCH transmissions per CC;
  determining a hybrid automatic repeat request (HARQ)-acknowledgement (ACK) codebook size based on a number of the multiple PDSCH transmissions, the maximum number of PDSCH transmissions, and a resulting ACK or negative acknowledgement (NACK) for each of the multiple PDSCH transmissions; and
  generating a plurality of HARQ bits for each of the multiple PDSCH transmissions, wherein the plurality of HARQ bits is equal to the maximum number of PDSCH transmissions per group.

18. The method of claim 17, wherein the plurality of HARQ bits includes a decoding acknowledgement for each of the multiple PDSCH transmissions and one or more NACK bits corresponding to the difference between the plurality of multi-PDSCH transmission and the maximum number of PDSCH transmissions per group.

19. The method of claim 18, wherein the HARQ-ACK codebook size is the product of a total DAI (T-DAI) indicating a total number of PDCCH monitoring occasions in a CC group of a last PDCCH monitoring occasion and the maximum number of PDSCH transmissions per group.

20. The method of claim 17, wherein the DCI transmission comprises:
  a counter downlink assignment indicator (C-DAI) indicating a cumulative number of PDCCH monitoring occasions in a CC group up to a current C-DAI; and
  a total DAI (T-DAI) indicating a total number of PDCCH monitoring occasions in a CC group.

* * * * *